United States Patent
Ma et al.

(10) Patent No.: US 10,048,399 B2
(45) Date of Patent: Aug. 14, 2018

(54) SOFT MAGNETIC BANDS FOR TILTED COIL ANTENNAS

(71) Applicant: Halliburton Energy Services, Inc., Houston, TX (US)

(72) Inventors: Jin Ma, Singapore (SG); Glenn Andrew Wilson, Singapore (SG); Burkay Donderici, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 15/513,961

(22) PCT Filed: Oct. 20, 2015

(86) PCT No.: PCT/US2015/056457
§ 371 (c)(1),
(2) Date: Mar. 23, 2017

(87) PCT Pub. No.: WO2017/069742
PCT Pub. Date: Apr. 27, 2017

(65) Prior Publication Data
US 2017/0299760 A1    Oct. 19, 2017

(51) Int. Cl.
*G01V 3/28* (2006.01)
*E21B 17/20* (2006.01)
*H01Q 7/00* (2006.01)
*H01Q 1/04* (2006.01)
*E21B 47/12* (2012.01)
*E21B 49/00* (2006.01)

(52) U.S. Cl.
CPC ............. *G01V 3/28* (2013.01); *E21B 17/20* (2013.01); *E21B 47/12* (2013.01); *E21B 49/00* (2013.01); *H01Q 1/04* (2013.01); *H01Q 7/00* (2013.01)

(58) Field of Classification Search
CPC .................................. E21B 17/20; G01V 3/28
See application file for complete search history.

(56) References Cited

U.S. PATENT DOCUMENTS

| | | |
|---|---|---|
| 6,181,138 B1 | 1/2001 | Hagiwara et al. |
| 6,297,639 B1 | 10/2001 | Clark et al. |
| 6,788,065 B1 | 9/2004 | Homan et al. |
| 7,286,091 B2 | 10/2007 | Chen et al. |

(Continued)

FOREIGN PATENT DOCUMENTS

WO    2005084411 A1    6/2015

OTHER PUBLICATIONS

International Search Report and Written Opinion for PCT/US2015/056457, dated Jun. 30, 2016.

*Primary Examiner* — Nicole Coy
*Assistant Examiner* — Kristyn A Hall
(74) *Attorney, Agent, or Firm* — McDermott Will & Emery LLP

(57) ABSTRACT

An antenna assembly includes a tool mandrel having a tool axis, and a coil including a plurality of windings wrapped about the tool mandrel at a winding angle offset from the tool axis. A soft magnetic band radially interposes the coil and the tool mandrel and extends about a circumference of the tool mandrel at a band angle orthogonal to the winding angle. The soft magnetic band includes a plurality of inserts, and a gap is defined between each laterally adjacent insert and the gap extends parallel to the tool axis.

18 Claims, 12 Drawing Sheets

(56) References Cited

U.S. PATENT DOCUMENTS

| | | |
|---|---|---|
| 7,345,487 B2 | 3/2008 | Bittar et al. |
| 7,663,372 B2 | 2/2010 | Signorelli et al. |
| 8,207,738 B2 | 6/2012 | Wang |
| 8,212,567 B2 | 7/2012 | Signorelli et al. |
| 8,264,228 B2 | 9/2012 | Bittar et al. |
| 8,400,160 B2 | 3/2013 | Fredette et al. |
| 8,471,562 B2 | 6/2013 | Knizhnik |
| 8,378,908 B2 | 12/2013 | Wisler et al. |
| 8,604,796 B2 | 12/2013 | Wisler et al. |
| 8,844,648 B2 | 9/2014 | Bittar et al. |
| 8,917,094 B2 | 12/2014 | Bittar et al. |
| 2005/0189945 A1 | 9/2005 | Reiderman |
| 2008/0068023 A1* | 3/2008 | Peter .................. G01V 3/30 324/338 |
| 2009/0179647 A1 | 7/2009 | Wang et al. |
| 2010/0244841 A1* | 9/2010 | Wang .................. E21B 47/102 324/333 |
| 2011/0074427 A1 | 3/2011 | Wang et al. |
| 2012/0081257 A1 | 4/2012 | Yosui et al. |
| 2013/0105224 A1 | 5/2013 | Donderici et al. |
| 2013/0141102 A1 | 6/2013 | Donderici et al. |
| 2014/0292340 A1 | 10/2014 | Yang |
| 2014/0368199 A1 | 12/2014 | Bittar et al. |

\* cited by examiner

SOFT MAGNETIC BANDS FOR TILTED COIL ANTENNAS

BACKGROUND

During drilling operations for the extraction of hydrocarbons, a variety of recording and transmission techniques are used to provide or record real-time data from the vicinity of a drill bit. Measurements of surrounding subterranean formations may be made throughout drilling operations using downhole measurement and logging tools, such as measurement-while-drilling (MWD) and/or logging-while-drilling (LWD) tools, which help characterize the formations and aid in making operational decisions. More particularly, such wellbore logging tools make measurements used to determine the electrical resistivity (or its inverse, conductivity) of the surrounding subterranean formations being penetrated, where the electrical resistivity indicates various geological features of the formations. Resistivity measurements may be taken using one or more antennas coupled to or otherwise associated with the wellbore logging tools.

Logging tool antennas are often formed by positioning coil windings about an axial section of the wellbore logging tool, such as a drill collar. A soft magnetic material is sometimes positioned beneath the coil windings to increase the efficiency and/or sensitivity of the logging tool antenna. The soft magnetic material facilitates a higher magnetic permeability path (i.e., a flux conduit) for the magnetic field generated by the coil windings, and helps shield the coil windings from adjacent drill collars and associated losses (e.g., eddy currents generated on the drill collars).

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

The present disclosure relates generally to wellbore logging tools used in the oil and gas industry and, more particularly, to the design of tilted coil antennas using a band of soft magnetic material to increase inductance or sensitivity of the tilted coil antenna.

Embodiments of the present disclosure describe improvements to the design of antenna assemblies used in resistivity logging tools for monitoring surrounding subterranean formations adjacent a drilled wellbore. The antenna assemblies described herein include tilted coil antennas that include a soft magnetic band to increase the inductance of the tilted coil antenna. The soft magnetic band may be tilted orthogonal to the winding angle of the tilted coil antenna and may consist of soft magnetic inserts that are cut parallel to a tool axis. The novel designs are shown to preserve directionality and improve gain of the antenna assemblies and the soft magnetic inserts that are easy and simple to manufacture. Accordingly, the antenna assemblies described herein can preserve the physical tilt angle of a coil transmitter, without needing to compromise physical orientations of the coil windings or soft magnetic inserts.

Figure 1:
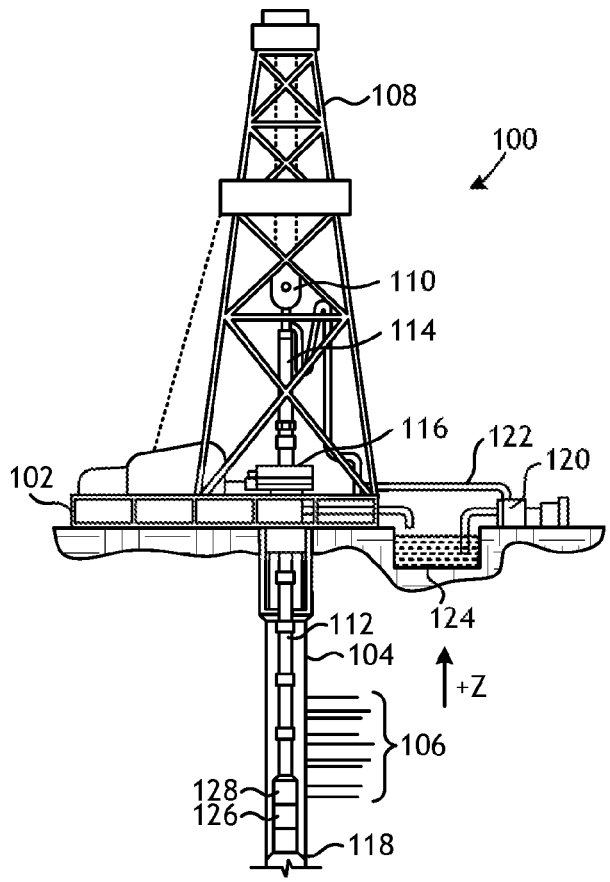
FIG. 1 is a schematic diagram of an exemplary drilling system that may employ the principles of the present disclosure.

FIG. 1 is a schematic diagram of an exemplary drilling system 100 that may employ the principles of the present disclosure, according to one or more embodiments. As illustrated, the drilling system 100 may include a drilling platform 102 positioned at the surface and a wellbore 104 that extends from the drilling platform 102 into one or more subterranean formations 106. In other embodiments, such as in an offshore drilling operation, a volume of water may separate the drilling platform 102 and the wellbore 104.

The drilling system 100 may include a derrick 108 supported by the drilling platform 102 and having a traveling block 110 for raising and lowering a drill string 112. A kelly 114 may support the drill string 112 as it is lowered through a rotary table 116. A drill bit 118 may be coupled to the drill string 112 and driven by a downhole motor and/or by rotation of the drill string 112 by the rotary table 116. As the drill bit 118 rotates, it creates the wellbore 104, which penetrates the subterranean formations 106. A pump 120 may circulate drilling fluid through a feed pipe 122 and the kelly 114, downhole through the interior of drill string 112, through orifices in the drill bit 118, back to the surface via the annulus defined around drill string 112, and into a retention pit 124. The drilling fluid cools the drill bit 118 during operation and transports cuttings from the wellbore 104 into the retention pit 124.

The drilling system 100 may further include a bottom hole assembly (BHA) coupled to the drill string 112 near the drill bit 118. The BHA may comprise various downhole measurement tools such as, but not limited to, measurement-while-drilling (MWD) and logging-while-drilling (LWD) tools, which may be configured to take downhole measurements of drilling conditions. The MWD and LWD tools may include at least one resistivity logging tool 126, which may comprise one or more coil antennas axially spaced along the length of the resistivity logging tool 126 and capable of receiving and/or transmitting electromagnetic (EM) signals. As will be described in detail below, the resistivity logging tool 126 may further comprise a soft magnetic band used to enhance and/or shield the EM signals and thereby increase the azimuthal sensitivity of the resistivity logging tool 126.

As the drill bit 118 extends the wellbore 104 through the formations 106, the resistivity logging tool 126 may continuously or intermittently collect azimuthally-sensitive measurements relating to the resistivity of the formations 106, i.e., how strongly the formations 106 opposes a flow of electric current. The resistivity logging tool 126 and other sensors of the MWD and LWD tools may be communicably coupled to a telemetry module 128 used to transfer measurements and signals from the BHA to a surface receiver (not shown) and/or to receive commands from the surface receiver. The telemetry module 128 may encompass any known means of downhole communication including, but not limited to, a mud pulse telemetry system, an acoustic telemetry system, a wired communications system, a wireless communications system, or any combination thereof. In certain embodiments, some or all of the measurements taken at the resistivity logging tool 126 may also be stored within the resistivity logging tool 126 or the telemetry module 128 for later retrieval at the surface upon retracting the drill string 112.

Figure 2:
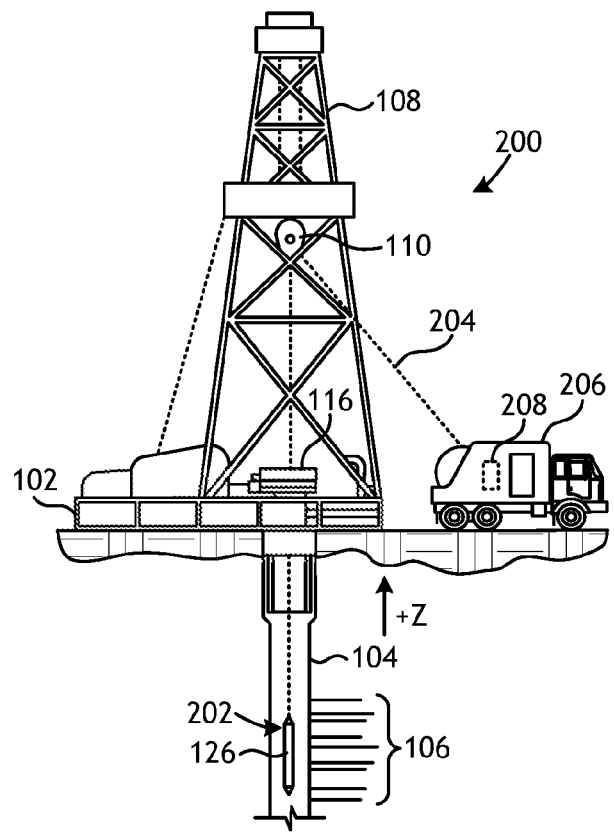
FIG. 2 is a schematic diagram of an exemplary wireline system that may employ the principles of the present disclosure.

At various times during the drilling process, the drill string 112 may be removed from the wellbore 104, as shown in FIG. 2, to conduct measurement/logging operations. More particularly, FIG. 2 depicts a schematic diagram of an exemplary wireline system 200 that may employ the principles of the present disclosure, according to one or more embodiments. Like numerals used in FIGS. 1 and 2 refer to the same components or elements and, therefore, may not be described again. As illustrated, the wireline system 200 may include a wireline instrument sonde 202 that may be suspended into the wellbore 104 by a cable 204. The wireline instrument sonde 202 may include the resistivity logging tool 126 described above, which may be communicably coupled to the cable 204. The cable 204 includes conductors for transporting power to the wireline instrument sonde 202 and also facilitates communication between the surface and the wireline instrument sonde 202. A logging facility 206, shown in FIG. 2 as a truck, may collect measurements from the resistivity logging tool 126, and may include computing and data acquisition systems 208 for controlling, processing, storing, and/or visualizing the measurements gathered by the resistivity logging tool 126. The computing facilities 208 may be communicably coupled to the resistivity logging tool 126 by way of the cable 204.

Figure 3A:
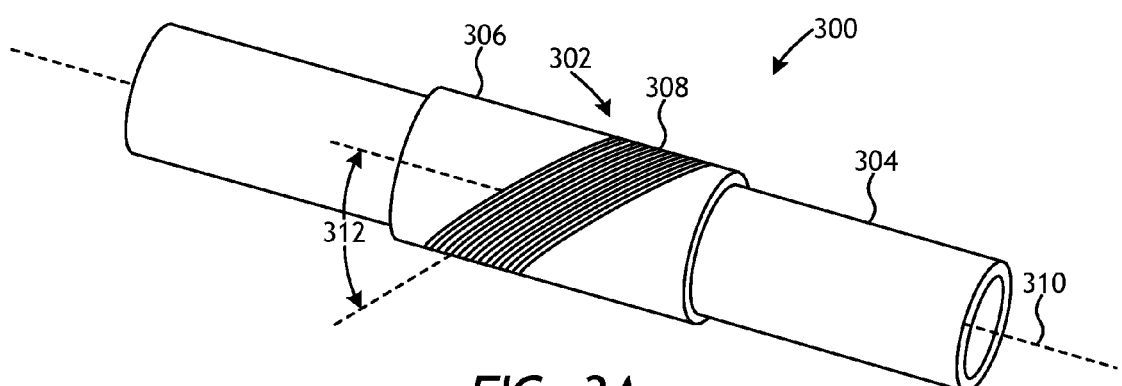
FIGS. 3A and 3B are views of an exemplary antenna assembly.

FIG. 3A is a partial isometric view of an exemplary resistivity logging tool 300, according to one or more embodiments. The resistivity logging tool 300 may be the same as or similar to the resistivity logging tool 126 of FIGS. 1 and 2 and, therefore, may be used in the drilling or wireline systems 100, 200 depicted therein. The resistivity logging tool 300 is depicted as including an antenna assembly 302 that can be positioned about a tool mandrel 304, such as a drill collar or the like. In some cases, the antenna assembly 302 includes a bobbin 306 and a coil 308 wrapped about the bobbin 306 and extending axially by virtue of winding along at least a portion of the outer surface of the bobbin 306.

The bobbin 306 may structurally comprise a high temperature plastic, a thermoplastic, a polymer (e.g., polyimide), a ceramic, or an epoxy material, but could alternatively be made of a variety of other non-magnetic, electrically insulating/non-conductive materials. The bobbin 306 can be fabricated, for example, by additive manufacturing (i.e., 3D printing), molding, injection molding, machining, or other known manufacturing processes.

The coil 308 can include any number of consecutive "turns" (i.e. windings of wire) about the bobbin 306, but will typically include at least a plurality (i.e. two or more) consecutive full turns, with each full turn extending 360° about the bobbin 306. In some embodiments, a pathway or guide for receiving the coil 308 may be formed along the outer surface of the bobbin 306. For example, one or more channels may be defined in the outer surface of the bobbin 306 to receive and seat the multiple windings of the coil 308. In other embodiments, however, the bobbin 306 may be omitted altogether from the resistivity logging tool 300, without departing from the scope of the disclosure.

The coil 308 can be concentric or eccentric relative to a tool axis 310 of the tool mandrel 304. As illustrated, the turns or windings of the coil 308 extend about the bobbin 306 at a winding angle 312 that is angularly offset from the tool axis 310. As a result, the antenna assembly 302 may be characterized and otherwise referred to as a "tilted coil antenna" or "directional antenna." In the illustrated embodiment, and by way of example, the winding angle 312 is angularly offset from the tool axis 310 by 45°, but could alternatively be any angle offset from the tool axis 310, without departing from the scope of the disclosure.

Figure 3B:
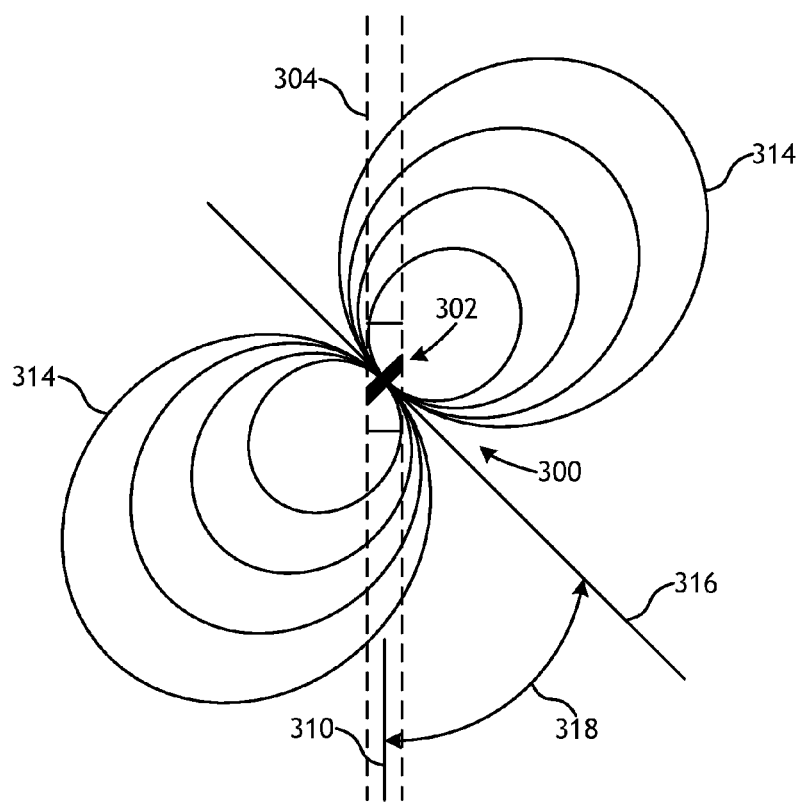

FIG. 3B is a schematic side view of the resistivity logging tool 300 of FIG. 3A. When current is passed through the coil 308 (FIG. 3A) of the antenna assembly 302, a dipole magnetic field 314 may be generated that extends radially outward from the antenna assembly 302 with a dipole magnetic moment 316 that extends generally orthogonal to the winding direction of the coil 308 at a magnetic field angle 318. Accordingly, since the winding angle 312 (FIG. 3A) is 45°, the resulting magnetic field angle 318 will also be 45° offset from the tool axis 310. As will be appreciated, however, the magnetic field angle 318 (i.e., directionality of the dipole magnetic moment 316) may be varied by adjusting or manipulating the winding angle 312.

Figure 4A:
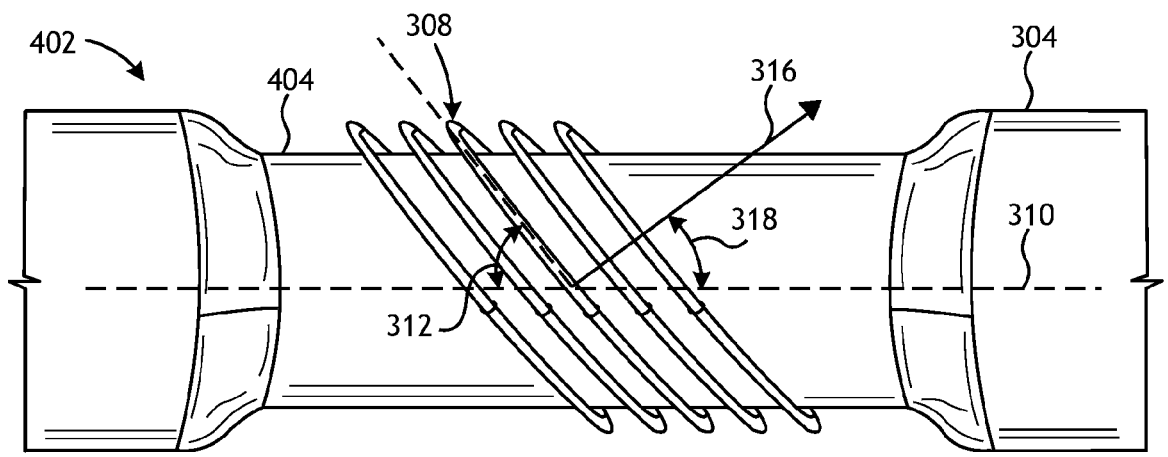
FIG. 4A depicts a side view of another exemplary antenna assembly.

FIG. 4A depicts a side view of an exemplary antenna assembly 402. The antenna assembly 402 may be similar in some respects to the antenna assembly 302 of FIGS. 3A-3B and, therefore, may be best understood with reference thereto, where like numerals represent like element not described again. As illustrated, the antenna assembly 402 includes the coil 308 wrapped about the tool mandrel 304 and, more particularly, within a saddle 404 defined on the tool mandrel 304. The saddle 404 may comprise a portion of the tool mandrel 304 that exhibits a reduced-diameter as compared to the remaining portions of the tool mandrel 304. Some or all of the components of the antenna assembly 402 may be arranged within the saddle 404. While not shown in this embodiment, the bobbin 306 (FIG. 3A) may alternatively be included to interpose the coil 308 and the tool mandrel 304 (i.e., the saddle 404), as generally discussed above.

As illustrated, the windings of the coil 308 extend about the circumference of the tool mandrel 304 at the winding angle 312, which may be offset from the tool axis 310, for example, by 45°. As a result, the magnetic dipole moment 316 generated by the coil 308 may extend from the tool mandrel 304 at the magnetic field angle 318, which is orthogonal to the winding angle 312 of the coil 308. The directionality of the magnetic dipole moment 316 may generally correspond to the direction in which the coil 308 emits the dipole magnetic field 314 (FIG. 3B) when current is passed therethrough. In some applications, it may be desired for best results to have the magnetic dipole moment 316 offset from the tool axis 310 by 45°, but the magnetic field angle 318 could alternatively be any angle between parallel and perpendicular to the tool axis 310 because of effects caused by the tool mandrel 304 or as a result of using a soft magnetic band, as described below.

Figure 4B:
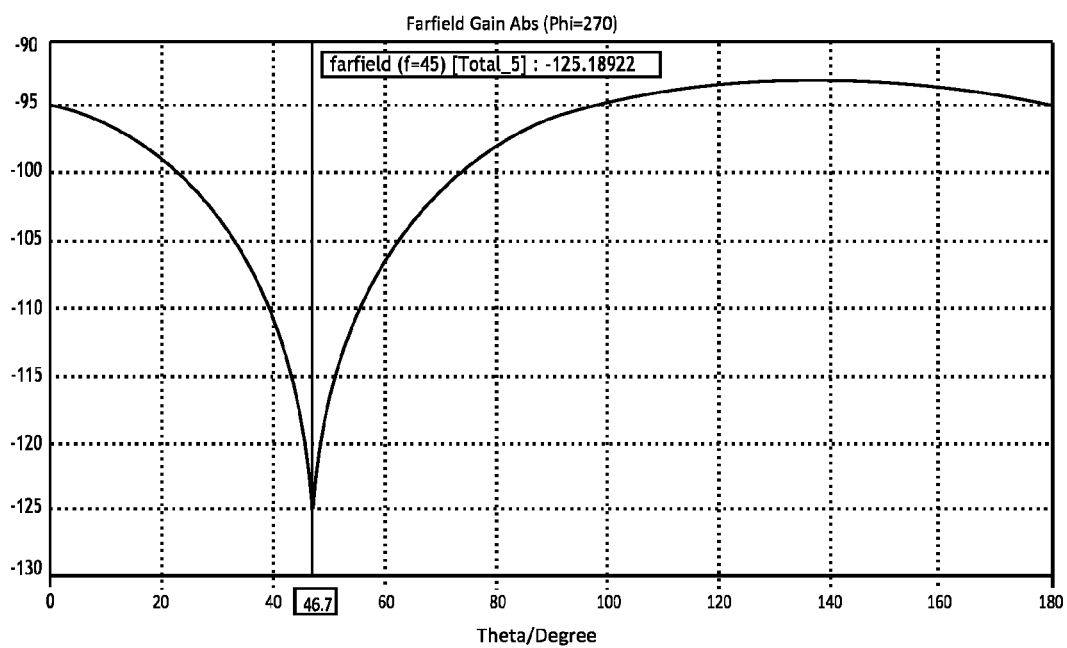
FIG. 4B is a plot showing a simulated response of the directionality of the magnetic dipole moment of the coil of the antenna assembly of FIG. 4A upon being excited.

FIG. 4B is a plot showing a simulated response of the directionality of the magnetic dipole moment 316 of the coil 308 upon being excited. As depicted, the effective directionality of the magnetic dipole moment 316 is 46.7° with a gain of approximately −93 dB. This model is an exemplary directional LWD coil antenna and will, therefore, be used as a reference to which the following simulations for other antenna assembly embodiments discussed herein are benchmarked.

Figure 5A:
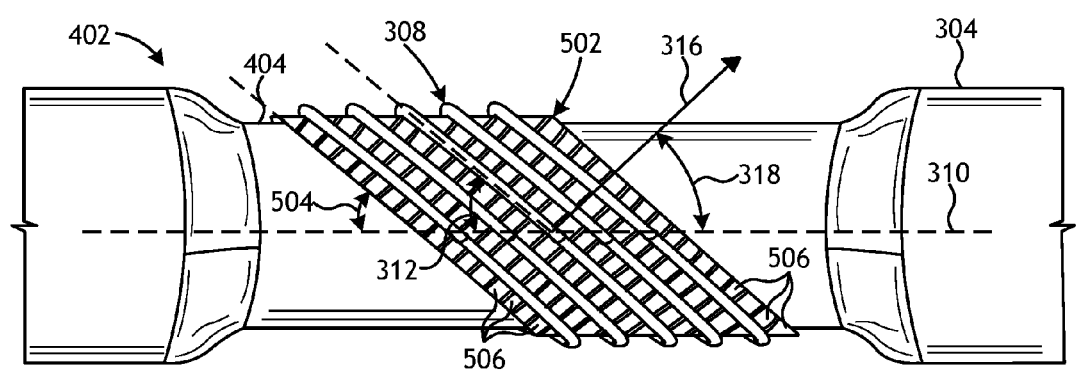
FIG. 5A depicts a side view of another exemplary antenna assembly.

FIG. 5A depicts another embodiment of the antenna assembly 402. In the illustrated embodiment, a soft magnetic band 502 interposes the coil 308 and the tool mandrel 304 within the saddle 404. The soft magnetic band 502 may be configured to shield the coil winding 308 from eddy currents generated by the tool mandrel 304, thereby increasing the azimuthal sensitivity of the antenna assembly 402 and/or increasing the efficiency or strength of the dipole magnetic field 314 (FIG. 3B) of the coil 308.

To facilitate this effect, the soft magnetic band 502 may comprise a soft magnetic material or any material that exhibits relatively high resistivity, high magnetic permeability, and low magnetic loss (e.g., hysteresis, magnetostriction, etc.). One suitable soft magnetic material that may be used includes ferrites, which generally comprise a composite mixture of a powder iron/ferrite material and a binder, such as a silicone-based rubber, an elastomer, an RTV, a polymer (such as polyimide), a ceramic, or an epoxy. The resulting mixture is molded and/or pressed into desired geometric shapes and configurations that conform to the shape of the soft magnetic band 502. Other suitable soft magnetic materials that may be used in the soft magnetic band 502 include, but are not limited to, mu-metal, permalloy, metallic glass (metglass), or any combination of the foregoing.

The soft magnetic band 502 may comprise a generally annular ring that extends about the circumference of the tool mandrel 304 (e.g., within the saddle 404) at a band angle 504. In the illustrated embodiment, the band angle 504 and the winding angle 312 are substantially the same such that the soft magnetic band 502 interposes the coil 308 and the tool mandrel 304 about the corresponding circumference of the tool mandrel 304. To help maintain the directionality of the magnetic dipole moment 316 at 45° relative to the tool axis 310, the soft magnetic band 502 may comprise a plurality of strips or inserts 506 that extend perpendicular to the coil 308. Accordingly, in some cases, the soft magnetic band 502 may comprise a discontinuous annular ring extending about the circumference of the tool mandrel 304 at the band angle 504.

Figure 5B:
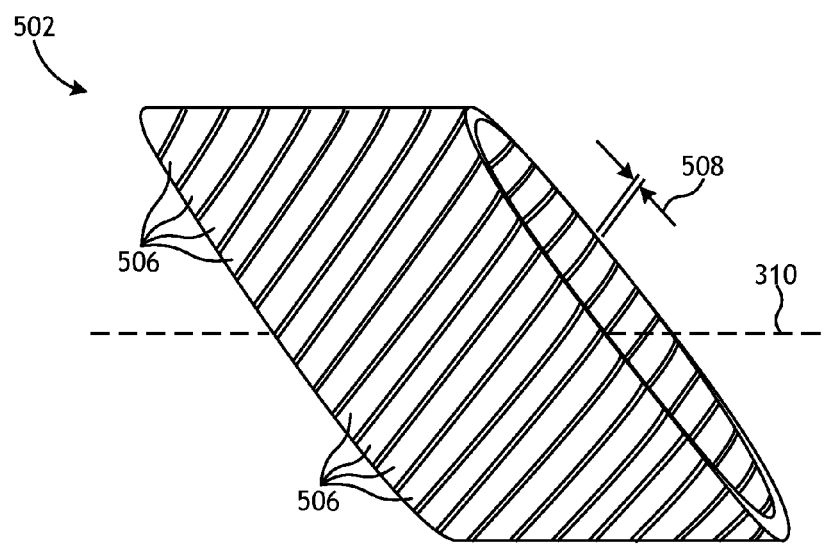
FIG. 5B is an isometric view of the soft magnetic band of FIG. 5A.

FIG. 5B is an isometric view of the soft magnetic band 502 of FIG. 5A, including the inserts 506. As illustrated, the inserts 506 exhibit a tilted cutting shape and, therefore, may be referred to as "tilted" inserts 506. Each "tilted" insert 506 may be separated by a small gap 508 that prevents physical contact between laterally adjacent inserts 506, and thereby prevent a continuous magnetic path between the adjacent inserts 506. In some embodiments, the gap 508 may be filled with a material that exhibits a relative permeability ($\mu_r$) of approximately 1, which is equivalent to the permeability of free space or air ($\mu_o$). In other embodiments, the gap 508 may not be filled with any particular material but may instead allow air to separate the adjacent inserts 506. In any case, the gap 508 essentially serves as a non-magnetic insulator between the adjacent inserts 506.

As illustrated, each "tilted" insert 506 is required to exhibit a complex geometry having a unique cross-section that must be twisted and arched to conform to the curvature of the tool mandrel 304 (FIG. 5A) and/or the saddle 404 (FIG. 5A). As a result, it can be quite difficult and expensive to accurately manufacture the inserts 506.

Figure 5C:
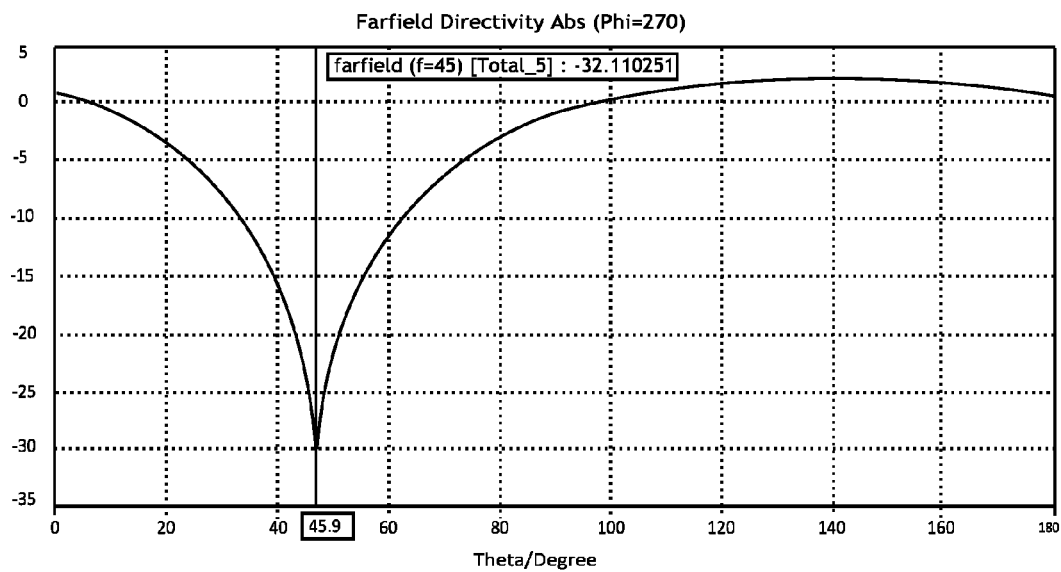
FIG. 5C is a plot showing a simulated response of the directionality of the magnetic dipole moment of the antenna assembly of FIG. 5A upon being excited.

FIG. 5C is a plot showing a simulated response of the directionality of the magnetic dipole moment 316 of the coil 308 of the antenna assembly 402 of FIG. 5A upon being excited. As depicted, the effective directionality of the magnetic dipole moment 316 is 45.9°. In this and all subsequent simulations, the magnetic permeability ($\mu_m$) of the material of the soft magnetic band 502 (and any variations thereof) is 100 and the conductivity is 0.008 S/m. The gain of the antenna in FIG. 5A is −76 dB, which is a 14 dB improvement over the antenna assembly 402 of FIG. 4A. Accordingly, it can be observed that the soft magnetic band 502 can help maintain the antenna directionality and improve the gain of the antenna assembly 402, but it is nonetheless difficult and expensive to manufacture.

Figure 6A:
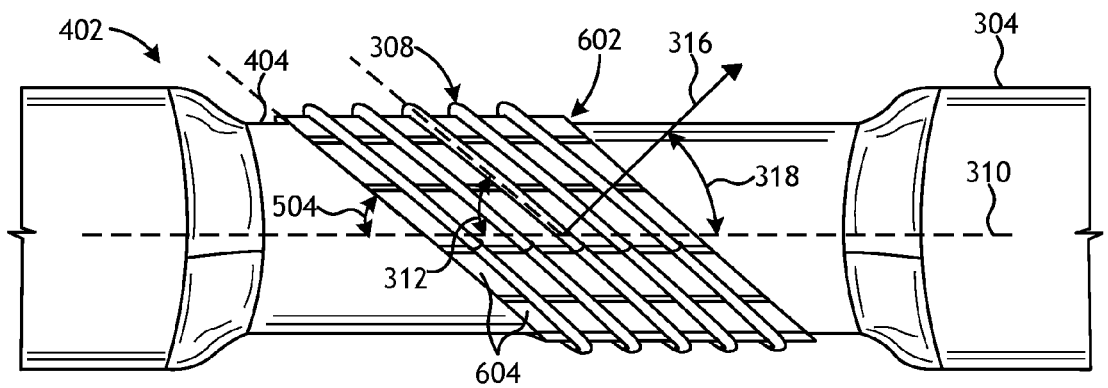
FIG. 6A depicts a side view of another exemplary antenna assembly.

FIG. 6A depicts another embodiment of the antenna assembly 402. In the embodiment of FIG. 6A, a soft magnetic band 602 again interposes the coil 308 and the tool mandrel 304 within the saddle 404 and extends about the circumference of the tool mandrel 304 at the band angle 504, which is substantially similar to the winding angle 312. The soft magnetic band 602 may be similar in some respects to the soft magnetic band 502 of FIGS. 5A-5B, such as being made of similar soft magnetic materials. Unlike the soft magnetic band 502 of FIGS. 5A-5B, however, the inserts 604 of the soft magnetic band 602 are cut axially, which is a simpler and cheaper way to manufacture the soft magnetic band 602 as compared to the tilted inserts 506 of FIGS. 5A-5B.

Figure 6B:
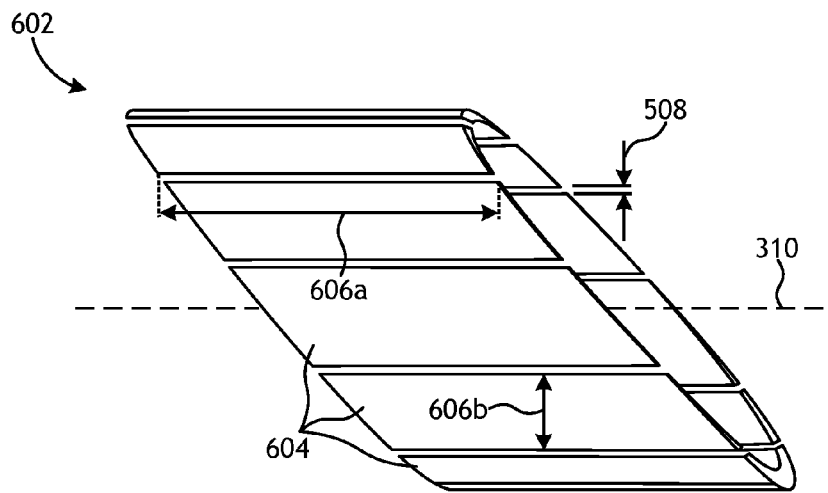
FIG. 6B is an isometric view of the soft magnetic band of FIG. 6A.

FIG. 6B is an isometric view of the soft magnetic band 602, including the inserts 604. As illustrated, the inserts 604 comprise generally rectangular or parallelogram-shaped members (depending on where angularly located about the circumference of the tool mandrel 304) separated by the gap 508. Each insert 604 may have a length 606a and a width 606b, where the length 606a of each axially cut insert 604 extends substantially parallel to the tool axis 310. As a result, the gap 508 separating each laterally adjacent insert 604 may be aligned axially with the tool axis 310 and otherwise run parallel thereto. Moreover, each insert 604 may exhibit an arcuate shape across the width that conforms to the curvature of the tool mandrel 304 (FIG. 6A) and/or the saddle 404 (FIG. 6A).

Figure 6C:
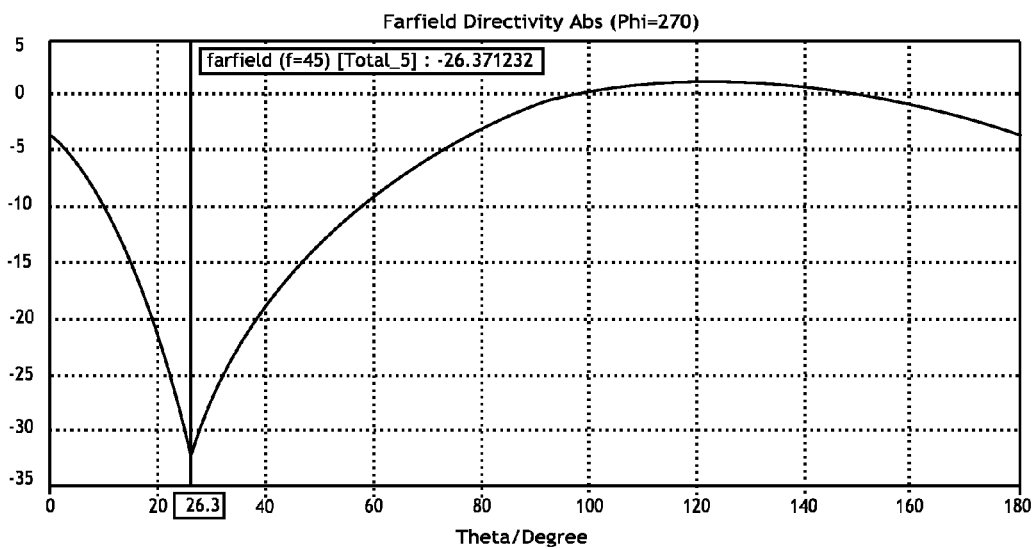
FIG. 6C is a plot showing a simulated response of the directionality of the magnetic dipole moment of the antenna assembly of FIG. 6A upon being excited.

FIG. 6C is a plot showing a simulated response of the directionality of the magnetic dipole moment 316 of the coil 308 of the antenna assembly 402 of FIG. 6A upon being excited. As depicted, the effective directionality of the magnetic dipole moment 316 is 26.3°, which represents a marked degradation as compared to the magnetic dipole moment directionality of the tilted coil antenna assembly 402 of FIG. 5A. As a result, while the soft magnetic band 602 of FIGS. 6A-6B may be easier and cheaper to manufacture as compared to the soft magnetic band 502 of FIGS. 5A-5B, its design is not able to effectively maintain the directionality of the antenna assembly 402.

Figure 7A:
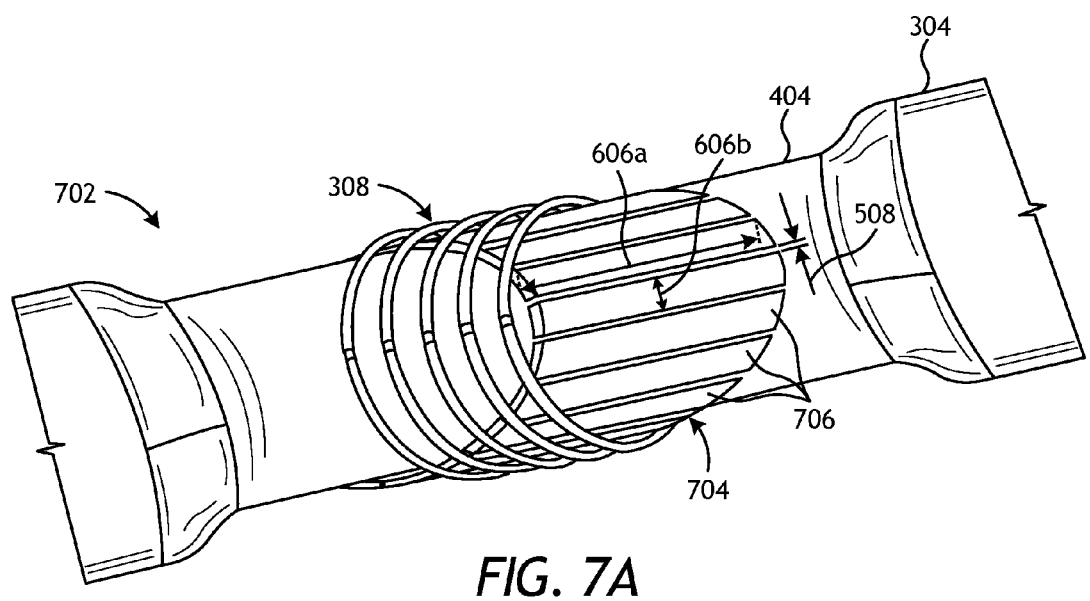
FIGS. 7A and 7B are isometric and side views, respectively, of an exemplary antenna assembly that incorporates the principles of the present disclosure.
Figure 7B:
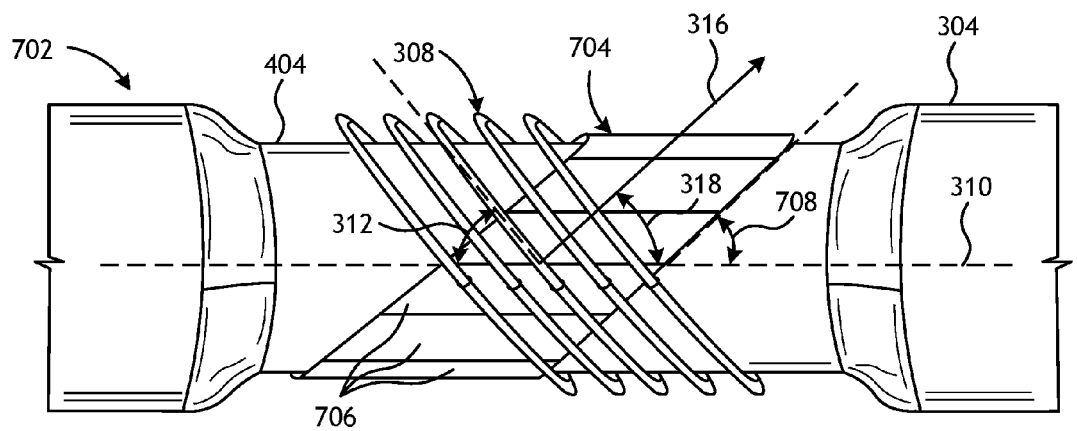

Referring now to FIGS. 7A and 7B, illustrated are isometric and side views, respectively, of an exemplary antenna assembly 702 that may incorporate the principles of the present disclosure. The antenna assembly 702 may be similar in some respects to the antenna assemblies 402 of FIGS. 4A, 5A-5B, and 6A-6B and therefore may be best understood with reference thereto, where similar numerals refer to like elements or components that may not be described again in detail.

Similar to the antenna assemblies 402 of FIGS. 4A, 5A-5B, and 6A-6B, for example, the antenna assembly 702 includes the coil 308 wrapped about the tool mandrel 304 and, in some embodiments, positioned within the saddle 404. The windings of the coil 308 extend about the tool mandrel 304 at the winding angle 312 (FIG. 7B), which, as noted above, may be angularly offset from the tool axis 310 (FIG. 7B) by 45°, but could alternatively be any angle offset from the tool axis 310. As a result, the magnetic dipole moment 316 (FIG. 7B) generated by the coil 308 may extend from the tool mandrel 304 at the magnetic field angle 318 (FIG. 7B), which is orthogonal to the winding angle 312.

In some embodiments, as indicated above, it may be desired to have the magnetic dipole moment 316 angularly offset from the tool axis 310 by 45° for best operation of the antenna assembly 702. It should be noted, however, that embodiments of the present disclosure are not limited to designing and otherwise optimizing antenna assemblies that exhibit a 45° magnetic field angle 318. Rather, in some embodiments, it may be desired to vary the directionality of the magnetic dipole moment 316 and, therefore, the magnetic field angle 318 may alternatively encompass any angle between parallel and perpendicular to the tool axis 310, without departing from the scope of the disclosure.

Similar to the antenna assemblies 402 of FIGS. 4A, 5A-5B, and 6A-6B, the antenna assembly 702 may also include a soft magnetic band 704 that radially interposes the coil 308 and the tool mandrel 304 (e.g., the saddle 404) and may be made of similar soft magnetic materials listed above for the soft magnetic band 502. The soft magnetic band 704 may be similar in some respects to the soft magnetic band 602 of FIGS. 6A-6B. For instance, the soft magnetic band 704 may include a plurality of axially cut inserts 706, each comprising generally rectangular or parallelogram-shaped members (depending on where angularly located about the circumference of the tool mandrel 304) separated by the gap 508 (FIG. 7A). Furthermore, the length 606a of each axially cut insert 706 extends substantially parallel to the tool axis 310 and, as a result, the gap 508 separating each laterally adjacent insert 604 may be aligned axially with the tool axis 310 and otherwise run parallel thereto. Moreover, each insert 604 exhibits an arcuate shape across the width 606b that conforms to the curvature of the tool mandrel 304 and/or the saddle 404.

Unlike the soft magnetic band 602 of FIGS. 6A-6B, however, the soft magnetic band 704 may extend about the circumference of the tool mandrel 304 (e.g., the saddle 404) at a band angle 708 (FIG. 7B) that is orthogonal to the winding angle 312. Accordingly, the soft magnetic band 704 may not only be characterized as "tilted" with respect to the tool axis 310, but may also be referred to as a "reversed" soft magnetic band. In embodiments where the winding angle 312 is 45° offset from the tool axis 310, the band angle 708 may also be 45° offset from the tool axis 310, but angularly opposite the winding angle 312 along the tool axis 310. Since the coil 308 and the soft magnetic band 704 are each wrapped about the circumference of the tool mandrel 304 in orthogonal directions, at least a portion of the coil 308 extends axially past the soft magnetic band 704 where the soft magnetic band 704 fails to radially interpose the coil 308 and the tool mandrel 304.

Figure 7C:
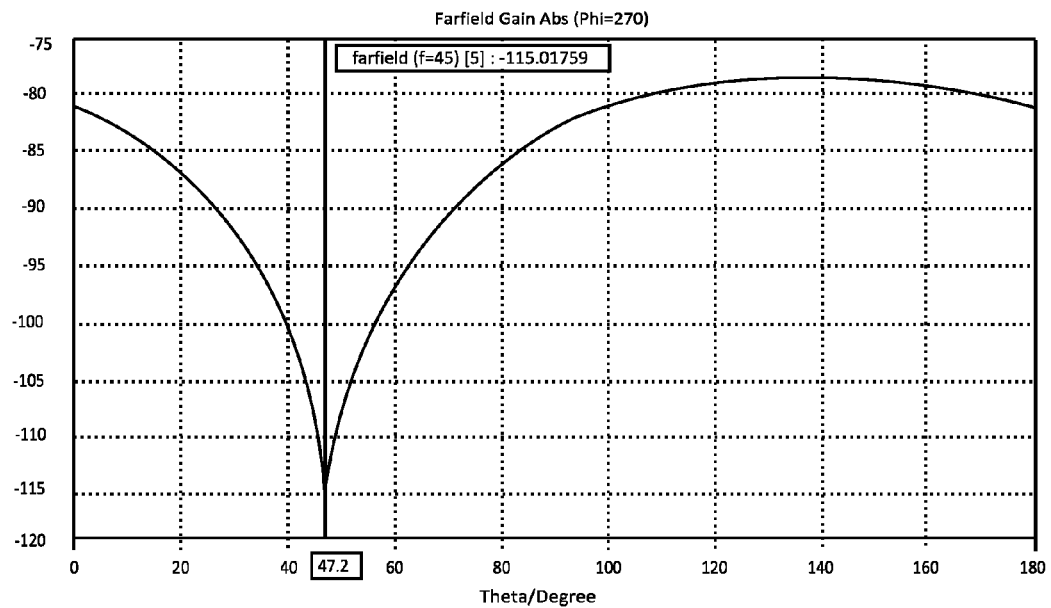
FIG. 7C is a plot showing a simulated response of the directionality of the magnetic dipole moment of the antenna assembly of FIGS. 7A-7B upon being excited.

FIG. 7C is a plot showing a simulated response of the directionality of the magnetic dipole moment 316 of the antenna assembly 702 of FIGS. 7A and 7B upon being excited. As depicted in FIG. 7C, the effective directionality of the magnetic dipole moment 316 is 47.2° with a gain of −78 dB, which represents a 12 dB improvement over the antenna assembly 402 of FIGS. 4A-4B and is much closer to the desired 45° directionality as compared to the antenna assembly 402 of FIGS. 6A-6B. Accordingly, while employing a reversed design of the soft magnetic band 704, simulation results show that the antenna assembly 702 not only preserves the near-field and far-field directionality of the magnetic dipole moment 316, but also maintains the gain relative to the magnetic dipole moment directionality of the tilted coil antenna assembly 402 of FIG. 5A.

Figure 8A:
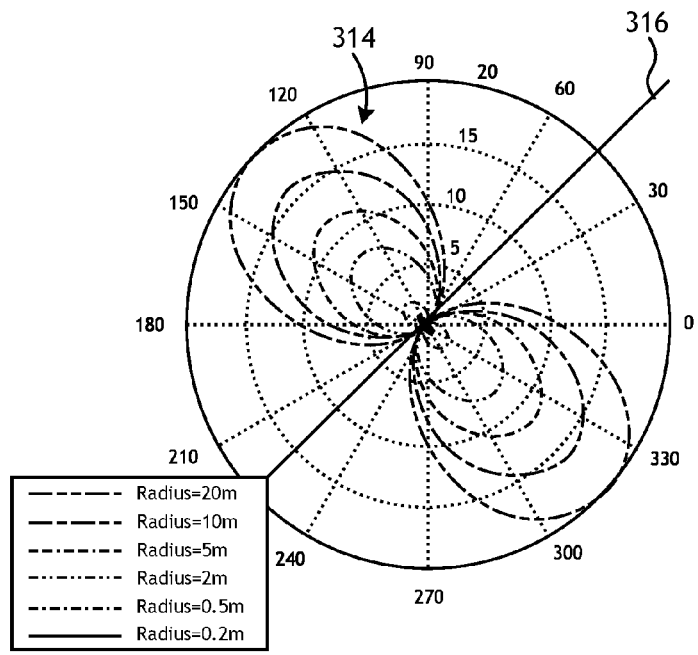
FIGS. 8A and 8B are radial plots depicting the sensitivity or near-field directionality of the resulting magnetic fields generated by two antenna assemblies.
Figure 8B:
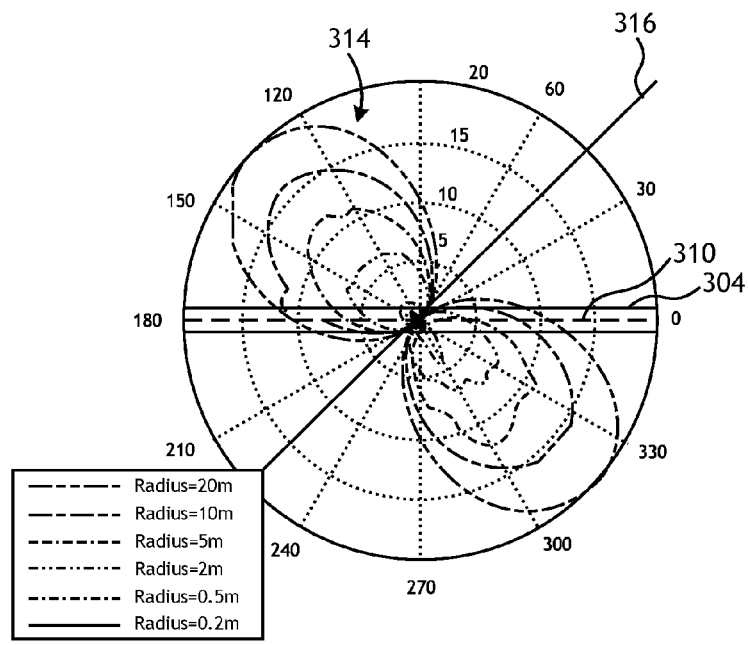

FIGS. 8A and 8B are radial plots depicting the sensitivity or near-field directionality of the resulting magnetic fields 314 generated by two antenna assemblies. More particularly, FIG. 8A depicts the normalized sensitivity at 32 kHz for a single turn coil loop in free space where no soft magnetic band interposes the coil 308 and the tool mandrel 304. FIG. 8B depicts the normalized sensitivity at 32 kHz for the antenna assembly 702 of FIGS. 7A-7B with the reversed soft magnetic band 704 interposing the coil 308 and the tool mandrel 304.

As illustrated, the winding angle 312 (FIGS. 3A, 4A, 5A, 6A, and 7B) of the coil 308 (FIGS. 3A, 4A, 5A, 6A, and 7A-7B) is at or near 45° from the tool axis 310, thereby resulting in the magnetic dipole moment 316 also extending at about 45° from the tool axis 310, but orthogonal to the winding angle 312 and otherwise angularly opposite the winding angle 312 along the tool axis 310. As compared to the plot in FIG. 8A, the resulting magnetic field 314 of FIG. 8B shows that not only is the far-field magnetic angle maintained with the reversed soft magnetic band 704 of FIGS. 7A-7B, but the near-field magnetic field angle is also maintained. More particularly, as depicted in FIG. 8B, from 0.2 meters to 20 meters away from the antenna, the directionality of the magnetic field 314 remains quite stable at 45°. Since the depth of investigation for LWD antenna is normally within 30 meters, this near-field sensitivity of the antenna assembly shows that the design of the antenna assembly 702 of FIGS. 7A-7B should share the same calibrated measurement as the conventional design of FIGS. 4A-4B. Thus, the same post-processing algorithms used for conventional antenna designs may be used with the antenna assembly 702 of FIGS. 7A-7B for formation interpretation and evaluation.

Figure 9A:
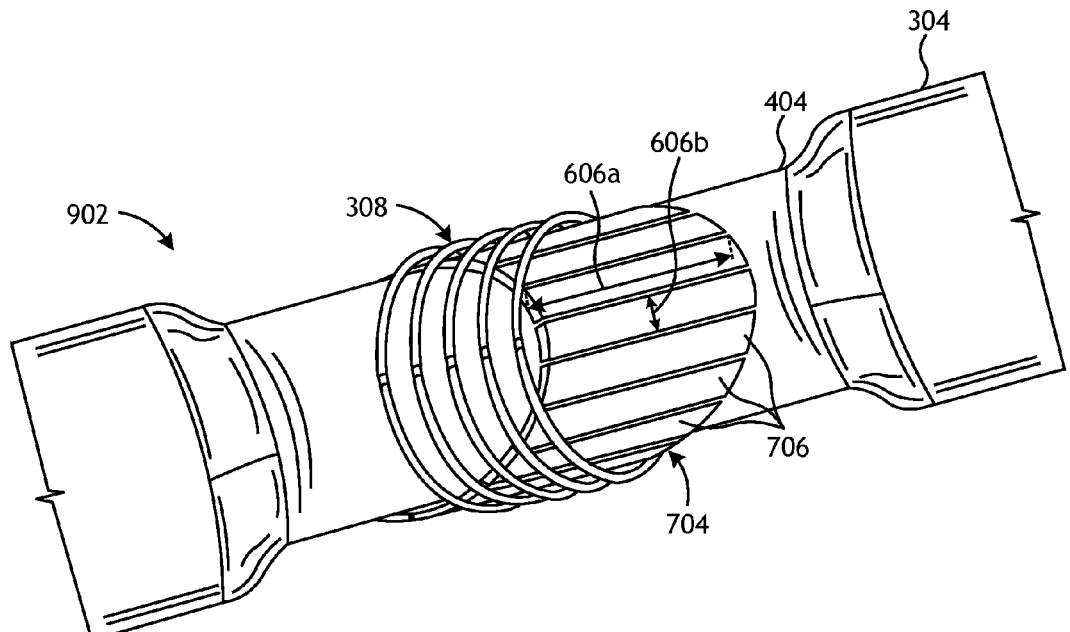
FIGS. 9A and 9B are isometric and side views, respectively, of another exemplary antenna assembly that incorporates the principles of the present disclosure.
Figure 9B:
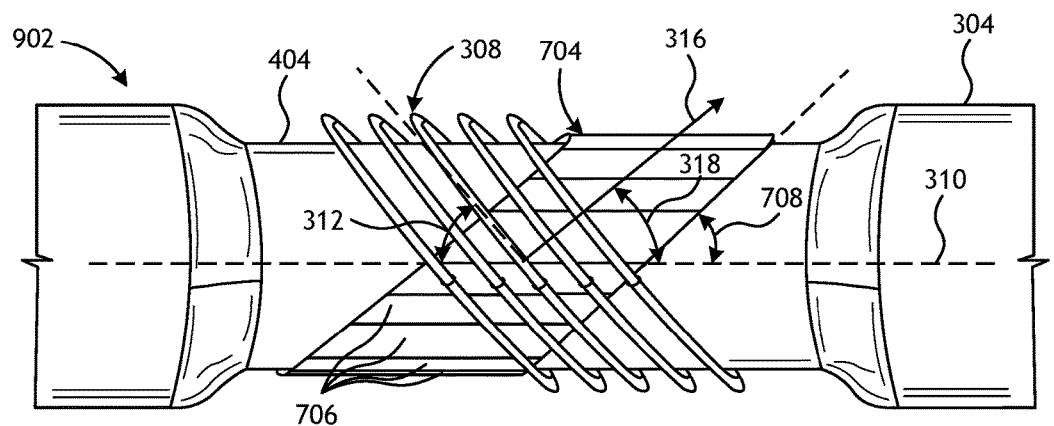

FIGS. 9A and 9B depict isometric and side views, respectively, of another exemplary antenna assembly 902 that may incorporate the principles of the present disclosure. The antenna assembly 902 may be similar to the antenna assembly 702 of FIGS. 7A and 7B and therefore may be best understood with reference thereto, where like numerals represent like elements not described again. As illustrated, the antenna assembly 902 includes the coil 308 wrapped about the tool mandrel 304 at the winding angle 312 (FIG. 9B), and the soft magnetic band 704 that extends about the circumference of the tool mandrel 304 at the band angle 708 (FIG. 9B), which is orthogonal to the winding angle 312.

The difference between the antenna assembly 902 and the antenna assembly 702 of FIGS. 7A and 7B is the number of axially cut inserts 706 used in the soft magnetic band 704. The soft magnetic band 704 of FIGS. 7A-7B, for example, uses twelve axially cut inserts 706, while the soft magnetic band 704 of FIGS. 9A-9B uses eighteen axially cut inserts 706. Accordingly, the length 606a of the axially cut inserts 706 in each antenna assembly 702, 902 may be similar or different, but the width 606b of the axially cut inserts 706 in the antenna assembly 902 is smaller than the width 606b of the axially cut inserts 706 in the antenna assembly 702 to accommodate the increased number of inserts 706 about the circumference of the tool mandrel 304.

Figure 9C:
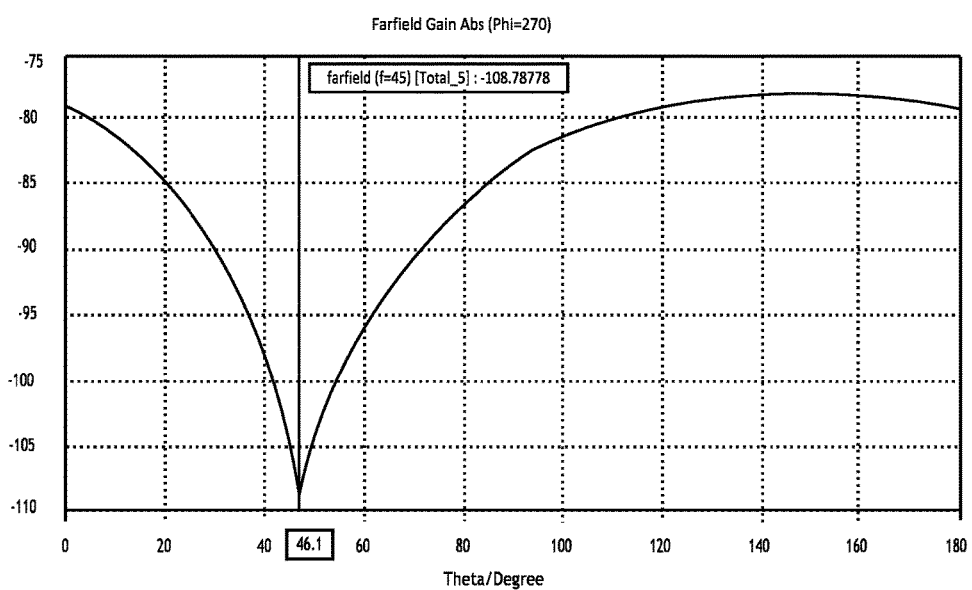
FIG. 9C is a plot showing a simulated response of the directionality of the magnetic dipole moment of the antenna assembly of FIGS. 9A-9B upon being excited.

FIG. 9C is a plot showing a simulated response of the directionality of the magnetic dipole moment 316 of the antenna assembly 902 of FIGS. 9A and 9B upon being excited. As depicted in FIG. 9C, the effective directionality of the magnetic dipole moment 316 is 46.1° with a gain of −78 dB, which represents a 14 dB improvement over the antenna assembly 402 of FIGS. 4A-4B. The simulated effective directionality is also much closer to the desired 45° directionality as compared to the antenna assembly 402 of FIGS. 6A-6B, but also closer as compared to the antenna assembly 702 of FIGS. 7A-7B. Accordingly, increasing the number of inserts 706 (FIGS. 9A-9B) may have the effect of bringing the magnetic dipole moment 316 closer to the desired 45° magnetic field angle.

Figure 10A:
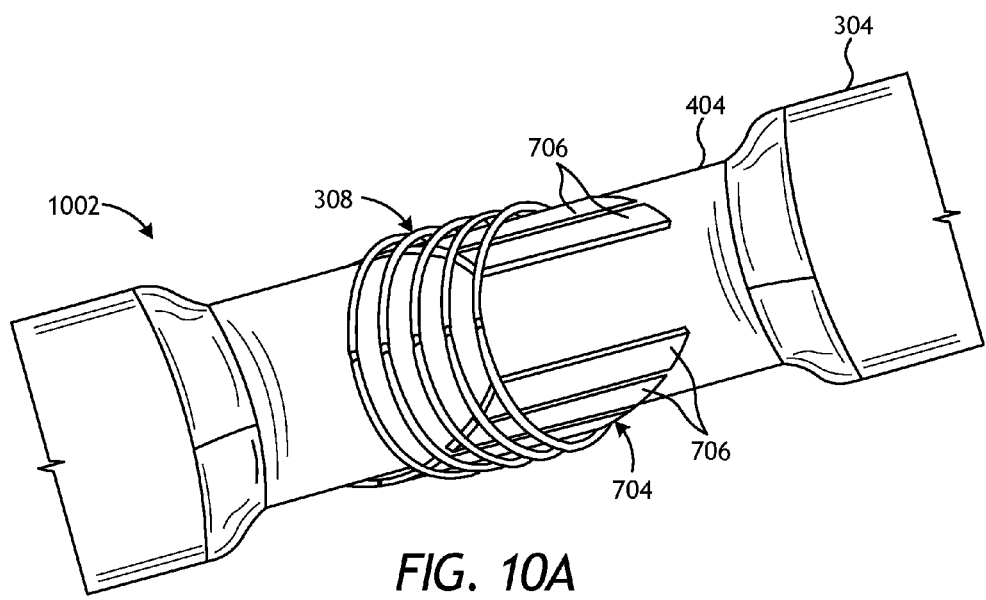
FIGS. 10A and 10B are isometric and side views, respectively, of another exemplary antenna assembly that incorporates the principles of the present disclosure.
Figure 10B:
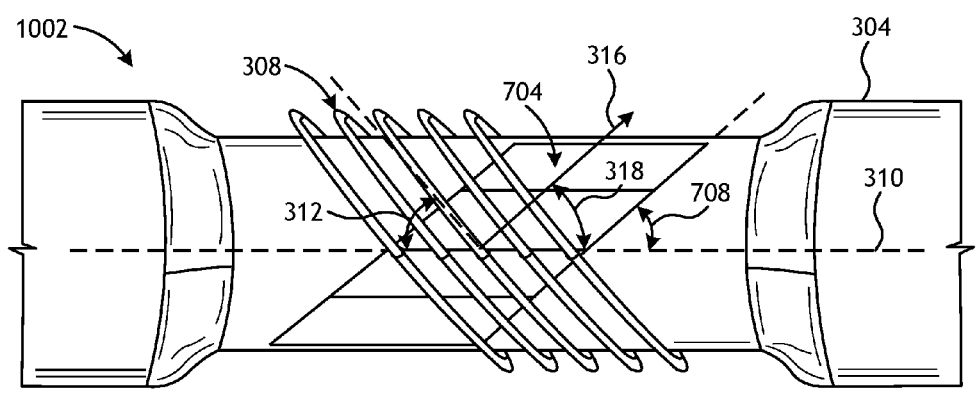

FIGS. 10A and 10B depict isomeric and side views, respectively, of another exemplary antenna assembly 1002 that may incorporate the principles of the present disclosure. The antenna assembly 1002 may be similar to the antenna assemblies 702 and 902 of FIGS. 7A-7B and 9A-9B, respectively, and therefore may be best understood with reference thereto, where like numerals represent like elements not described again. As illustrated, the antenna assembly 1002 includes the coil 308 wrapped about the tool mandrel 304 at the winding angle 312 (FIG. 10B), and the soft magnetic band 704 that extends about the circumference of the tool mandrel 304 at the band angle 708 (FIG. 10B), which is orthogonal to the winding angle 312.

The antenna assembly 1002 differs from the antenna assemblies 702, 902, however, in that one or more of the inserts 706 may be removed from the soft magnetic band 704 of the antenna assembly 1002 at opposing circumferential locations about the tool mandrel 304 (e.g., the saddle 404). More particularly, one or more inserts 706 may be removed from the soft magnetic band 704 at locations about the tool mandrel 304 where portions of the coil 308 extend axially past the soft magnetic band 704 or where the soft magnetic band 704 otherwise fails to radially interpose the coil 308 and the tool mandrel 304.

Figure 10C:
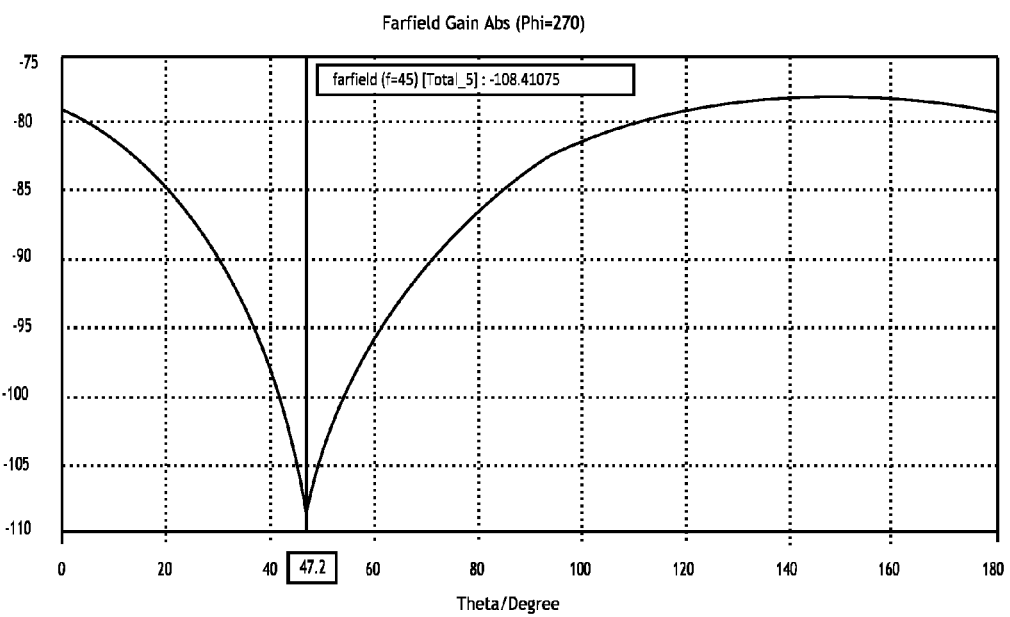
FIG. 10C is a plot showing a simulated response of the directionality of the magnetic dipole moment of the antenna assembly of FIGS. 10A-10B upon being excited.

FIG. 10C is a plot showing a simulated response of the directionality of the magnetic dipole moment 316 of the antenna assembly 1002 of FIGS. 10A and 10B upon being excited. As depicted, the effective directionality of the magnetic dipole moment 316 is 47.2° with a gain of −76 dB, which represents a 12 dB improvement over the antenna assembly 402 of FIGS. 4A-4B. The simulated effective directionality is also substantially similar to the effective directionality of the antenna assembly 702 of FIGS. 7A-7B. Accordingly, it is shown that removing one or more inserts 706 from the soft magnetic band 704 at locations where the soft magnetic band 704 does not interpose the coil 308 may have little or no impact on directionality. As will be appreciated, such an embodiment may prove advantageous in requiring less soft magnetic material for the soft magnetic band 704, which has no appreciable impact on the performance of the antenna assembly 1002.

According to the present disclosure, the soft magnetic band 704 of any of the antenna assemblies 702, 902, 1002 described herein may be tuned and otherwise optimized to alter the effective magnetic field angle 318 and, therefore, the directionality of the magnetic dipole moment 316. It may be desired, for instance, to tune the antenna assemblies 702, 902, 1002 such that the effective magnetic field angle 318 is at or near 45° offset from the tool axis 310. In some embodiments, this may be accomplished by altering the band angle 708 of the soft magnetic band 704 with respect to the winding angle 312, where the band angle 708 is orthogonal (90° offset) to the winding angle 312. In such cases, the band angle 708 may be altered such that the angular offset between the band angle 708 and the winding angle 312 is 91° or 89°, which may change the magnetic field angle 318 from, for example, 46° to 45°.

In other embodiments, the number and/or size of the inserts 706 may be altered to tune the effective magnetic field angle 318 and, therefore, the directionality of the magnetic dipole moment 316. This can be seen from the simulated response plots of FIGS. 7C and 9C, where the increased number of inserts 706 in the antenna assembly 902 brought the magnetic dipole moment 316 closer to the desired 45° magnetic field angle, as compared to the antenna assembly 702. As indicated above, this resulted in an improvement from 47.2° effective directionality with twelve inserts 706 to 46.1° effective directionality with eighteen inserts 706. It may follow, then, that further increasing the number of inserts 706 (e.g., 20+) may bring the effective magnetic field angle 318 to exactly 45°. Similarly, varying at least one of the length 606a (FIGS. 7A and 9A) and the width 606b (FIGS. 7A and 9A) may also tune the effective magnetic field angle 318 and, therefore, the directionality of the magnetic dipole moment 316.

In other embodiments, the size of the gap 508 (FIG. 7A) separating laterally adjacent inserts 706 may be varied to tune the effective magnetic field angle 318 and, therefore, the directionality of the magnetic dipole moment 316. Similar to varying the number or size of the inserts 706, varying the gap 508 may also bring the magnetic dipole moment 316 closer to the desired 45° magnetic field angle. In other embodiments, the shape of one or more of the inserts 706 may be varied and otherwise tailored. For instance, the edges and/or the corners of one or more of the inserts may be rounded, chamfered, or otherwise smoothed. If the edges are rounded in one direction, for instance, the field directionality in that direction may be softened and thus the antenna angle may be slightly tuned towards the orthogonal direction.

In yet other embodiments, the geometry of the tool mandrel 304 may be altered adjacent the coil 308. In such embodiments, for example, the shoulders of the saddle 404 (i.e., axial ends of the saddle 404) may be enlarged. Moreover, the grooves or channels defined in a bobbin (e.g., the bobbin 306 of FIG. 3A) used to receive and seat the coil 308 may be deepened. Because of eddy currents generated by the tool mandrel 304, the winding angle 312 may be slightly larger than the winding angle 312 in embodiments without the tool mandrel 304. Modifying the tool mandrel 304 is equivalent to modifying the eddy current effect so that a desired winding angle 312 can be achieved.

While not shown herein, the antenna assemblies of any of the embodiments described herein may be coated in a polymer (e.g., PEEK), a polymer-ceramic blend, or a ceramic to protect the coil 308 from mechanical damage. Such materials exhibit high mechanical strength and are electrically resistive, thus protecting the presently described antenna assemblies while not attenuating the electromagnetic fields transmitted or received. Moreover, it will be appreciated that, while the antenna assemblies have been described herein with respect to MWD and/or LWD applications, the principles of the present disclosure are equally applicable to antenna assemblies (i.e., transmitters and/or receivers) permanently deployed behind casing, for example, and forming part of a reservoir monitoring system.

Embodiments disclosed herein include:

A. An antenna assembly that includes a tool mandrel having a tool axis, a coil including a plurality of windings wrapped about the tool mandrel at a winding angle offset from the tool axis, and a soft magnetic band radially interposing the coil and the tool mandrel and extending about a circumference of the tool mandrel at a band angle orthogonal to the winding angle, wherein the soft magnetic band includes a plurality of inserts, and wherein a gap is defined between each laterally adjacent insert and the gap extends parallel to the tool axis.

B. A method that includes introducing a wellbore logging tool into a wellbore, the wellbore logging tool including an antenna assembly that includes a tool mandrel having a tool axis, a coil including a plurality of windings wrapped about the tool mandrel at a winding angle offset from the tool axis, and a soft magnetic band radially interposing the coil and the tool mandrel and extending about a circumference of the tool mandrel at a band angle orthogonal to the winding angle, wherein the soft magnetic band includes a plurality of inserts, and wherein a gap is defined between each laterally adjacent insert and the gap extends parallel to the tool axis. The method further including obtaining measurements of a surrounding subterranean formation with the wellbore logging tool.

C. A method of assembling an antenna assembly that includes positioning a soft magnetic band about a circumference of a tool mandrel having a tool axis, wherein the soft magnetic band extends at a band angle offset from the tool axis and includes a plurality of inserts, and wherein a gap is defined between each laterally adjacent insert and the gap extends parallel to the tool axis, wrapping a plurality of coil windings about the tool mandrel at a winding angle orthogonal to the band angle such that the soft magnetic band radially interposes at least a portion of the coil windings, and tuning the soft magnetic band to optimize a magnetic dipole moment of the antenna assembly.

Each of embodiments A, B, and C may have one or more of the following additional elements in any combination: Element 1: wherein the tool mandrel defines a saddle and the coil and the soft magnetic band are positioned in the saddle. Element 2: wherein the soft magnetic band comprises a material selected from the group consisting of a ferrite, mu-metal, permalloy, metallic glass, and any combination thereof. Element 3: wherein each insert comprises a length that aligns axially with the tool axis, and a width, wherein each insert exhibits an arcuate shape across the width to conform to a curvature of the tool mandrel. Element 4: wherein each insert comprises a rectangular or parallelogram-shaped member. Element 5: wherein at least a portion of the coil extends axially past the soft magnetic band where the soft magnetic band fails to radially interpose the coil and the tool mandrel. Element 6: wherein one or more of the plurality of inserts is removed from the soft magnetic band at opposing circumferential locations about the tool mandrel where the portion of the coil extends axially past the soft magnetic band.

Element 7: wherein the tool mandrel is operatively coupled to a drill string and introducing the wellbore logging tool into the wellbore further comprises extending the wellbore logging tool into the wellbore on the drill string, and drilling a portion of the wellbore with a drill bit secured to a distal end of the drill string. Element 8: wherein introducing the wellbore logging tool into the wellbore further comprises extending the wellbore logging tool into the wellbore on wireline as part of a wireline instrument sonde.

Element 9: wherein tuning the soft magnetic band comprises altering the band angle with respect to the winding angle. Element 10: wherein tuning the soft magnetic band comprises altering a number of the plurality of inserts. Element 11: wherein each insert comprises a length that aligns axially with the tool axis and a width, and wherein tuning the soft magnetic band comprises varying at least one of the length and the width of one or more of the plurality of inserts. Element 12: wherein tuning the soft magnetic band comprises varying a size of the gap separating laterally adjacent inserts. Element 13: wherein tuning the soft magnetic band comprises varying a shape of one or more of the plurality of inserts. Element 14: wherein varying the shape comprises at least one of rounding, chamfering, and smoothing an edge or a corner of the one or more of the plurality of inserts. Element 15: wherein tuning the soft magnetic band comprises altering a geometry of the tool mandrel adjacent the plurality of coil windings and thereby reducing eddy current effects on the coil angle.

By way of non-limiting example, exemplary combinations applicable to A, B, and C include: Element 3 with Element 4; Element 5 with Element 6; and Element 13 with Element 14.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. An antenna assembly, comprising:
   a tool mandrel having a longitudinal axis;
   a coil including a plurality of windings wrapped about the tool mandrel and tilted to form a winding angle with respect to the longitudinal axis; and
   a soft magnetic band having an edge radially interposing the coil and the tool mandrel and extending about a circumference of the tool mandrel, the edge being tilted to form a band angle with respect to the longitudinal axis and orthogonal to the winding angle about the entire circumference of the tool mandrel, wherein the soft magnetic band includes a plurality of inserts, and wherein a gap is defined between each laterally adjacent insert and the gap extends parallel to the longitudinal axis.

2. The antenna assembly of claim 1, wherein the tool mandrel defines a saddle and the coil and the soft magnetic band are positioned in the saddle.

3. The antenna assembly of claim 1, wherein the soft magnetic band comprises a material selected from the group consisting of a ferrite, mu-metal, permalloy, metallic glass, and any combination thereof.

4. The antenna assembly of claim 1, wherein each insert comprises:
   a length that aligns axially with the longitudinal axis; and
   a width, wherein each insert exhibits an arcuate shape across the width to conform to a curvature of the tool mandrel.

5. The antenna assembly of claim 4, wherein each insert comprises a rectangular or parallelogram-shaped member.

6. The antenna assembly of claim 1, wherein at least a portion of the coil extends axially past the soft magnetic band where the soft magnetic band fails to radially interpose the coil and the tool mandrel.

7. The antenna assembly of claim 6, wherein one or more of the plurality of inserts is removed from the soft magnetic band at opposing circumferential locations about the tool mandrel where the portion of the coil extends axially past the soft magnetic band.

8. A method, comprising:
   introducing a wellbore logging tool into a wellbore, the wellbore logging tool including an antenna assembly that includes:
   a tool mandrel having a longitudinal axis;
   a coil including a plurality of windings wrapped about the tool mandrel and tilted to form a winding angle with respect to the longitudinal axis; and
   a soft magnetic band having an edge radially interposing the coil and the tool mandrel and extending about a circumference of the tool mandrel, the edge being tilted to form a band angle with respect to the longitudinal axis and orthogonal to the winding angle about the entire circumference of the tool mandrel, wherein the soft magnetic hand includes a plurality of inserts, and wherein a gap is defined between each laterally adjacent insert and the gap extends parallel to the longitudinal axis; and obtaining measurements of a surrounding subterranean formation with the wellbore logging tool.

9. The method of claim 8, wherein the tool mandrel is operatively coupled to a drill string and introducing the wellbore logging tool into the wellbore further comprises:
   extending the wellbore logging tool into the wellbore on the drill string; and
   drilling a portion of the wellbore with a drill bit secured to a distal end of the drill string.

10. The method of claim 8, wherein introducing the wellbore logging tool into the wellbore further comprises extending the wellbore logging tool into the wellbore on wireline as part of a wireline instrument sonde.

11. A method of assembling an antenna assembly, comprising:
   positioning a soft magnetic band, having an edge, about a circumference of a tool mandrel having a longitudinal axis, wherein the edge extends about the tool mandrel and is tilted to form a band angle with respect to the longitudinal axis, the soft magnetic band including a plurality of inserts, and wherein a gap is defined between each laterally adjacent insert and the gap extends parallel to the longitudinal axis;
   wrapping a plurality of coil windings about the tool mandrel at, the coil windings being tilted to form a winding angle with respect to the longitudinal axis and orthogonal to the band angle about the entire circumference of the tool mandrel, such that the soft magnetic band radially interposes at least a portion of the coil windings; and
   tuning the soft magnetic band to optimize a magnetic dipole moment of the antenna assembly.

12. The method of claim 11, wherein tuning the soft magnetic band comprises altering the band angle with respect to the winding angle.

13. The method of claim 11, wherein tuning the soft magnetic band comprises altering a number of the plurality of inserts.

14. The method of claim 11, wherein each insert comprises a length that aligns axially with the longitudinal axis and a width, and wherein tuning the soft magnetic band comprises varying at least one of the length and the width of one or more of the plurality of inserts.

15. The method of claim 11, wherein tuning the soft magnetic band comprises varying a size of the gap separating laterally adjacent inserts.

16. The method of claim 11, wherein tuning the soft magnetic band comprises varying a shape of one or more of the plurality of inserts.

17. The method of claim 16, wherein varying the shape comprises at least one of rounding, chamfering, and smoothing an edge or a corner of the one or more of the plurality of inserts.

18. The method of claim 11, wherein tuning the soft magnetic band comprises altering a geometry of the tool mandrel adjacent the plurality of coil windings and thereby reducing eddy current effects on the winding angle.

\* \* \* \* \*